UNITED STATES PATENT OFFICE.

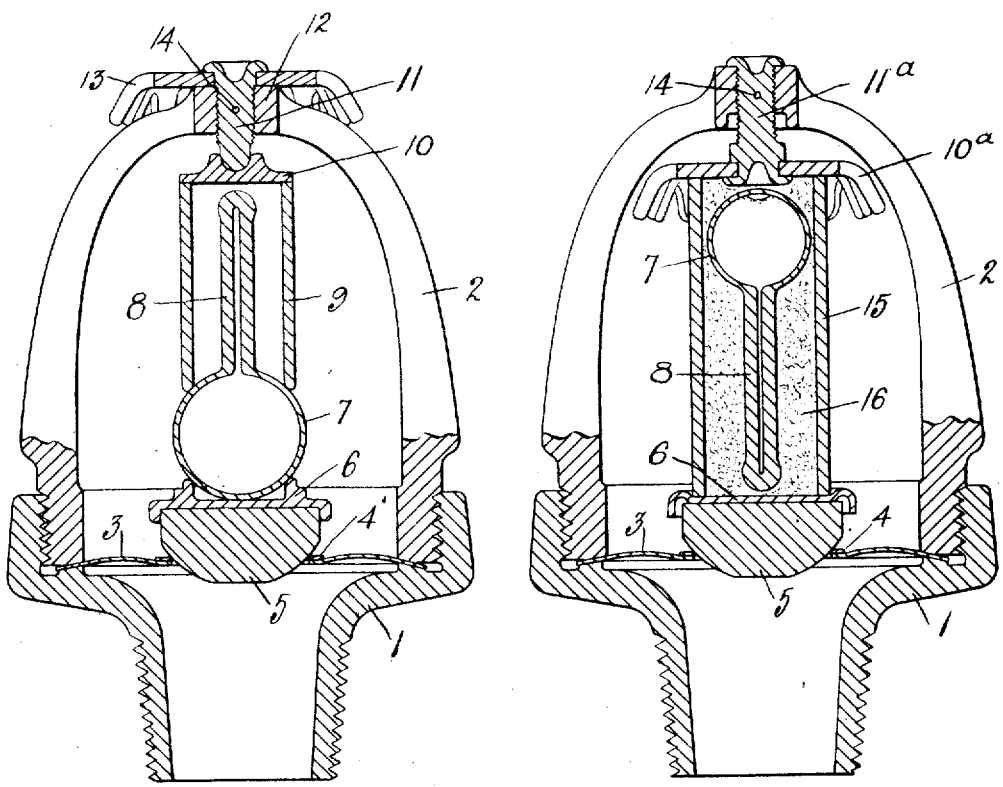

ALBERT J. LOEPSINGER, OF PROVIDENCE, RHODE ISLAND, ASSIGNOR TO GENERAL FIRE EXTINGUISHER COMPANY, OF NEW YORK, N. Y., A CORPORATION OF NEW YORK.

AUTOMATIC SPRINKLER.

1,273,387.

Specification of Letters Patent.

Patented July 23, 1918.

Application filed July 3, 1912. Serial No. 707,467.

*To all whom it may concern:*

Be it known that I, ALBERT J. LOEP-SINGER, of the city and county of Providence and State of Rhode Island, have invented certain new and useful Improvements in Automatic Sprinklers; and I do hereby declare the following specification, taken in connection with the accompanying drawings, forming a part of the same, to be a full, clear, and exact description thereof.

The present invention relates to that type of automatic sprinklers which embody in their construction a frangible vessel having expansible contents, and which are caused to be opened by the expansive or explosive force of the contents of such frangible vessel induced by the action of heat.

The object of the present invention is to secure with certainty a violent explosive action, which will be certain under all conditions to shatter the frangible vessel and release the valve-holding means, and at the same time to secure greater uniformity or regularity in the opening of the sprinklers at the predetermined temperature.

To that end the invention consists primarily in employing as the contents of the frangible vessel a liquid containing gas in solution, whereby when said frangible vessel is fractured by the expansion of its contents under the action of heat, there will be a sudden escape of the gas previously held in solution, which will cause a violent explosion which will be certain to completely shatter said frangible vessel. When ammonia gas is employed for the purpose it has been found that the explosion produced is particularly violent, and for this reason it is preferred to make use of such ammonia gas as the gas to be held in solution in the liquid contents of the frangible vessel. Any other gas, however, may be employed if desired.

In automatic sprinklers of this character it is desirable that the explosion shall take place at approximately the predetermined temperature, and it is important that the explosion when it does take place shall be of a violent character in order that the sprinkler shall with certainty and under all conditions be fully opened. Moreover, it is desirable, when a liquid having a gas in solution is employed as the contents of the frangible vessel, that the fracture of the vessel under the action of heat shall be produced by the expansion of the liquid and before any material amount of gas has escaped therefrom, which would be likely to result in a premature explosion.

To meet these conditions it is important that there shall be a proper ratio of gas to liquid in the contents of the vessel. If the quantity of gas be too small, the explosion will not be sufficiently violent, while if, on the other hand, the quantity of gas be too great, a sufficient quantity of gas will be likely to escape from the liquid as the temperature rises to produce a pressure of gas within the vessel which will serve to fracture the same and thus produce the explosion prematurely and before the predetermined temperature has been reached.

The invention therefore further consists in employing as the contents of the frangible vessel a liquid containing a prescribed quantity of gas in solution, whereby the character of the explosion may be determined and the temperature at which the same will take place may be rendered certain and uniform.

The invention may be employed either in a sprinkler in which the frangible vessel constitutes the means, or a part of the means, for holding the sprinkler closed, or in a sprinkler in which the frangible vessel does not constitute any part of the means for holding the valve closed. Both constructions of sprinkler are shown in the drawings.

Referring to the drawings, Figure 1 is a longitudinal section of an automatic sprinkler embodying the invention, in which the frangible vessel constitutes a part of the means for holding the sprinkler closed, and Fig. 2 is a corresponding longitudinal section of an automatic sprinkler in which the frangible vessel does not constitute any part of the means for holding the sprinkler closed, and in which a metallic plate is provided for collecting and conducting heat to the frangible vessel and its contents, said metallic plate also constituting the deflector of the sprinkler.

The sprinkler shown embodies the body portion 1 having a frame 2 preferably screwed into the body portion. A flexible diaphragm 3 having a central opening therein and properly secured in place, preferably by clamping the outer edge thereof between the body portion 1 and the frame 2, carries the seat 4 for the valve 5. This valve is preferably made of glass and the metal cap 6 rests thereon.

In the construction shown in Fig. 1 the frangible vessel 7, which is preferably in the form of a glass-bulb, constitutes a part of the means for holding the valve closed and is arranged to bear against the metal cap 6. The frangible vessel 7 is provided with an elongated hollow neck 8. A hollow member 9, preferably of cylindrical form, is arranged to bear at one end against the frangible vessel 7, the elongated hollow neck 8 of the frangible vessel 7 being located within and protected by said hollow member. Preferably this hollow member is made of glass, but it may be made of any other material desired, and as in this construction it is not necessary for the release of the valve that said member should be shattered, said member may, if desired, be made of a material which is not readily frangible. Bearing against the other end of the hollow member 9 is a metal plate 10.

When the valve-seat is formed upon or carried by a flexible diaphragm, as shown, the metallic plate 10 may be constructed and arranged to directly engage the frame 2, said metallic plate, the member 9, and the frangible vessel 7 together constituting a strut interposed between the valve and the frame to hold the valve to its seat.

In the construction shown, however, an adjusting screw 11 is employed, the outer end of the frame being provided with a screw-threaded boss 12 to receive the same. As shown the deflector 13 is secured to the adjusting screw 11 on the outside of the frame 2, and so that said adjusting screw may be turned by turning the deflector. When the valve has been properly adjusted to its seat the adjusting screw may be held in its adjusted position by a cross-pin 14 passed through said screw and the boss 12.

Referring now to Fig. 2, the sprinkler therein shown is the same in its general construction as the sprinkler shown in Fig. 1. In the construction shown in Fig. 2, however, the frangible vessel 7 does not constitute any part of the means for holding the valve closed, and a second frangible member 15 is employed as the means, or as a part of the means, for holding the valve closed. This second frangible member 15 is preferably made of glass and of cylindrical form, and the frangible vessel 7 is located within said member 15, and so that said frangible vessel and its hollow stem are inclosed and protected thereby.

Bearing against the opposite end of said frangible member 15 is a metallic plate 10¹ which in this case is made in the form of a deflector and is secured to the inner end of the adjusting screw 11ª. The adjustment of the valve to its seat is effected, as in the case of the construction shown in Fig. 1, by turning the deflector, and when the valve has been properly adjusted to its seat the adjusting screw may be held in its adjusted position by a cross-pin 14.

In the construction shown in Fig. 2 there is placed in the space between the frangible member 7 and the frangible member 15 a quantity of heat-conducting material 16, which may consist of metal filings, graphite, or other suitable material. It is preferred to completely fill this space with the heat-conducting material, as this facilitates the conduction of heat to the inner frangible vessel, but if desired a lesser quantity of conducting material may be employed and the space only partially filled therewith.

Referring now to the matter of preparing the frangible vessel or glass bulb for use as an element in the sprinklers shown and described, a convenient way for filling and sealing such glass bulbs so that the same will contain a liquid having gas in solution will now be described.

A sufficient quantity of water is placed in the bulb so that when the same is heated up to a desired high temperature, as for example 160° Fahrenheit, the bulb and its elongated neck will be completely filled with the water at such high temperature. The bulb and its contents are then cooled to normal temperature, as for example 70° Fah., which will cause a corresponding lowering of the level of the column of water in the neck of the bulb. A mark is then made upon the exterior of the neck at the then level of the column of water therein. The water is then entirely emptied out, and the bulb then filled with the liquid having gas in solution and preferably with an ammonia solution up to the mark which has been made on the neck.

By this method of filling the bulb the ammonia solution is prepared outside of the bulb and may be so prepared with a definite prescribed ratio of the gas to the liquid, and the ammonia solution so prepared is placed in the bulb at normal temperature.

A convenient way for sealing the bulb after the ammonia solution has been placed therein is this: The bulb is placed in a receptacle containing some good conducting or heat absorbing liquid, such for example as water or mercury, and heat then applied to fuse and close the end of the neck and thus hermetically seal the bulb. By this method of sealing the heat applied will be taken up by the surrounding liquid in the receptacle fast enough to prevent the escape of any material quantity of the gas from the bulb during the process of sealing.

The operation of the sprinklers shown and described will be readily understood. In both constructions when the sprinkler is subjected to the action of heat the effect will be to first expand the contents of the frangble vessel, and when as the result of such expansion, the vessel has become completely filled therewith, as it will be when the predetermined temperature has been reached, further expansion of the contents will serve to fracture the vessel, whereupon there will be a sudden escape of the gas previously held in solution, and a consequent sudden and violent explosion, which will completely shatter the frangible vessel.

In the construction shown in Fig. 1 the shattering of the frangible vessel itself will be sufficient to completely release the valve and open the sprinkler, the other parts being thrown out, and it is immaterial whether the hollow member 9 be shattered or not. In the construction shown in Fig. 2 the explosion which serves to shatter the frangible vessel 7 will also serve to shatter the frangible member 15 and thus to release the valve and open the sprinkler.

By employing as the contents of the frangible vessel a liquid containing gas in solution, the character of such contents may be readily regulated and the quantity of gas contained in the solution, or the ratio of gas to liquid, can be made always uniform. By the employment of a prescribed quantity of gas and a proper ratio of gas to liquid, the character of the explosion may be regulated and determined, and the temperature at which such explosion will take place may be rendered certain and uniform.

What I claim as my invention and desire to secure by Letters Patent is:

1. An automatic sprinkler embodying a frangible vessel containing a gas in solution which is not under pressure at normal temperature and adapted to effect the release of said sprinkler by the sudden escape of such gas when said vessel is fractured by the expansion of its contents under the action of heat.

2. An automatic sprinkler embodying a frangible vessel containing a liquid having a prescribed quantity of gas in solution which is not under pressure at normal temperature and adapted to effect the release of said sprinkler by the sudden escape of such gas when said vessel is fractured by the expansion of its contents under the action of heat.

3. An automatic sprinkler embodying a frangible vessel containing ammonia gas in solution and adapted to effect the release of said sprinkler by the sudden escape of such gas when said vessel is fractured by the expansion of its contents under the action of heat.

4. An automatic sprinkler embodying a frangible vessel containing a liquid having a prescribed quantity of ammonia gas in solution and adapted to effect the release of said sprinkler by the sudden escape of such gas when said vessel is fractured by the expansion of its contents under the action of heat.

5. An automatic sprinkler embodying a frangible vessel containing a gas in solution which is of such a character as to permit the sealing of said frangible vessel at normal temperature and is adapted to effect the release of said sprinkler by the sudden escape of such gas when said vessel is fractured by the expansion of its contents under the action of heat.

ALBERT J. LOEPSINGER.

Witnesses:
W. H. THURSTON,
J. H. THURSTON.